UNITED STATES PATENT OFFICE.

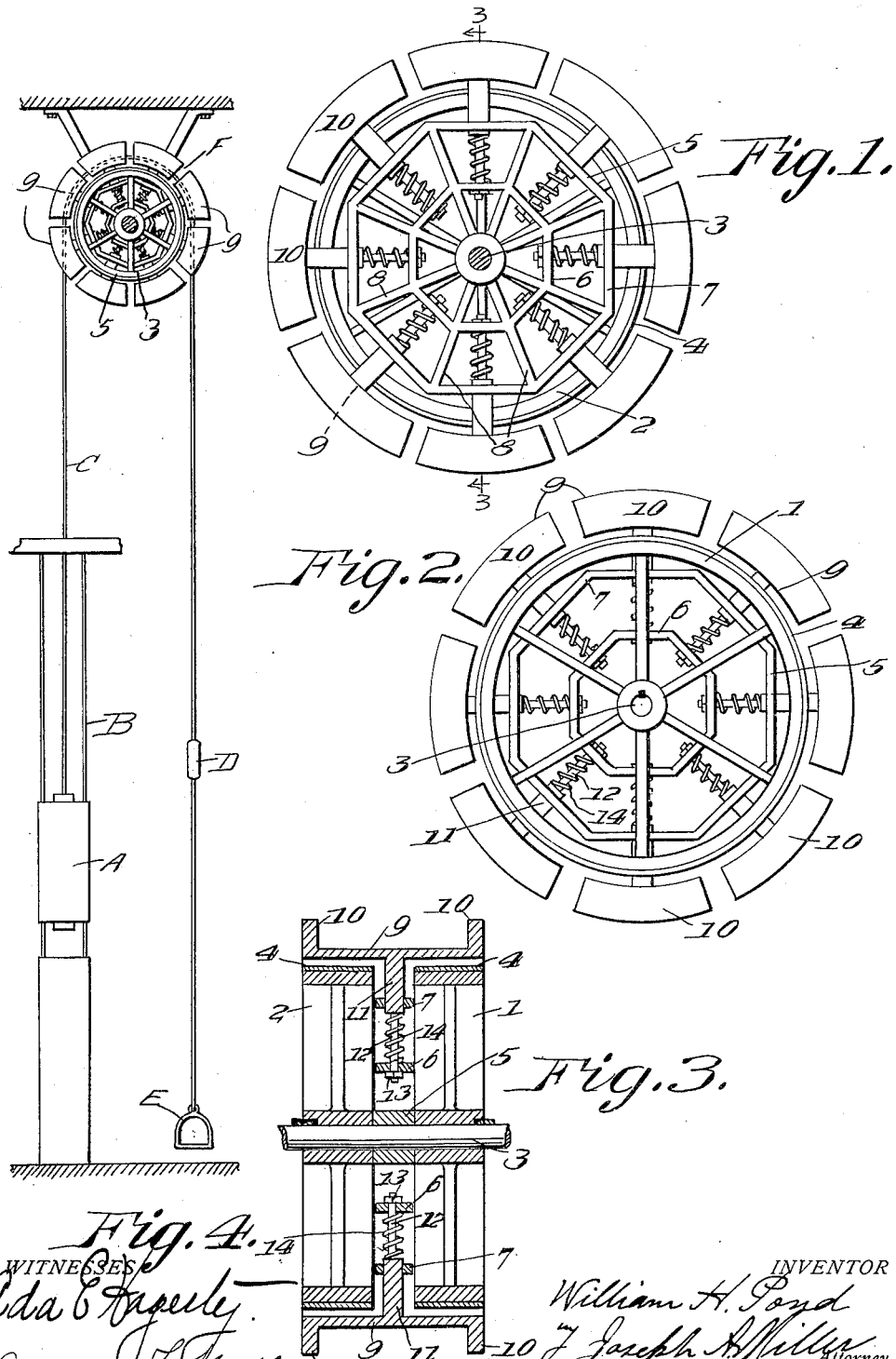

WILLIAM H. POND, OF PROVIDENCE, RHODE ISLAND.

LIFTING-PULLEY.

1,084,292.

Specification of Letters Patent.

Patented Jan. 13, 1914.

Application filed December 26, 1912. Serial No. 738,657.

*To all whom it may concern:*

Be it known that I, WILLIAM H. POND, a citizen of the United States, and a resident of Providence, in the county of Providence and State of Rhode Island, have invented a new and useful Improvement in Lifting-Pulleys, of which the following is a specification.

This invention relates to certain new and useful improvements in lifting pulleys, and pertains more particularly to a pulley used in connection with jewelers' stamps.

The invention is an improvement on the subject matter of my Patent No. 1,055,223, and has for its object a structure of the type set forth in which the segments that engage the belt are individually formed to prevent lateral movement of the latter, and further to provide segments which can be used with a pair of ordinary pulleys, instead of the specially constructed side plates that are disclosed in my said application.

In the drawings: Figure 1 is a side elevation, showing one of the pulleys removed. Fig. 2 is a similar view showing the side pulley in normal position. Fig. 3 is a section on the line 3—3 of Fig. 1, and Fig. 4 is a side elevation of the invention applied to a jeweler's stamp.

As is common in jewelers' stamps the weight or stamp A travels on guides B, the weight or stamp having a rope or leather belt C attached thereto. A hand knob D is secured to the belt and the free end of the latter has a foot stirrup E secured thereto. The belt passes over the pulley F.

In accordance with the present invention two ordinary side pulleys 1 and 2 are rigidly keyed to a continuously rotated shaft 3, whereby the pulleys rotate with the shaft. A lagging 4 is secured to the periphery of each of the pulleys, the lagging being formed of leather or similar material. Freely rotatable on the shaft 3 and surrounding the same is a spider frame 5 which consists of spaced inner and outer concentric members 6 and 7 connected by radial spokes 8. The pulley periphery or tread is composed of a plurality of segments 9, each of which segments has outwardly projecting side flanges 10, in order to engage the sides of the belt and prevent lateral movement of the latter. The inner face of each segment 9 is formed so that in cross section the same extends in a straight line as depicted in Fig. 3 of the drawings, in order that the inner faces of the segment will comformably engage the lagging 4 of each of the pulleys 1 and 2. Each segment has an inwardly-extending enlarged part 11 that terminates in a reduced shank 12, the parts 11 sliding through apertures provided therefor in the member 7 of the spider, and the shanks 12 sliding through apertures formed in the member 6, and have nuts 13 for limiting their outward movement. Coiled springs 14 surround shanks 12 and abut parts 11 and the periphery of the member 6 of the spider.

In operation it will be understood that under normal conditions the segments are forced outwardly by their respective springs so as to be held free of contact with the lagging 4 of the pulleys 1 and 2. When the operator grasps the knob D and pulls down on the belt, the weight of the stamp and belt causes four of the segments or half of the circumference of the wheel to be depressed against the action of the springs, thereby causing the inner faces of the four segments to frictionally engage the lagging of the pulleys 1 and 2, and as the latter are keyed to the shaft and rotate therewith, it will be seen that the segments will be caused to rotate with the shafts, thereby causing the belt which engages the segments to move with the latter, effecting lifting of the stamp. When the operator releases the belt and permits the stamp to drop on its working stroke, the segments will be lifted by their springs and the pulleys 1 and 2 will revolve independent of the segments, and since the latter remain quiescent, there will obviously be no wear or burning of the rope or belt.

It will further be noted that the width of each segment equals the distance between the outer sides of the pulleys, whereby each segment engages the entire width of the periphery of each pulley, with the result that the segments obtain a firm footing on the pulleys and reduce any danger of slippage to a minimum.

Having thus described my invention, I claim as new and desire to secure by Letters Patent:—

In combination with a shaft, a pair of spaced pulleys keyed to the shaft, leather or other similar material on the periphery of each pulley, a spider loosely mounted on the shaft and located in the space between said pulleys, and a series of spring pressed segments carried by the spider, each segment having a smooth unbroken inner face which extends in the same direction and is for engagement with the leather of each of the pulleys, each segment having an outwardly extending flange located at each side thereof.

In testimony whereof I have signed my name to this specification in the presence of two subscribing witnesses.

WILLIAM H. POND.

Witnesses:
ADA E. HAGERTY,
J. A. MILLER.

Copies of this patent may be obtained for five cents each, by addressing the "Commissioner of Patents, Washington, D. C."